United States Patent
Kudoh

(10) Patent No.: US 8,705,187 B2
(45) Date of Patent: Apr. 22, 2014

(54) LENS APPARATUS AND IMAGE-PICKUP APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/422,065

(22) Filed: Mar. 16, 2012

(65) Prior Publication Data

US 2012/0188659 A1    Jul. 26, 2012

Related U.S. Application Data

(62) Division of application No. 12/013,195, filed on Jan. 11, 2008, now Pat. No. 8,154,809.

(30) Foreign Application Priority Data

Jan. 17, 2007  (JP) ................................. 2007-007565

(51) Int. Cl.
*G02B 7/02* (2006.01)
*G02B 7/10* (2006.01)

(52) U.S. Cl.
CPC .............. *G02B 7/023* (2013.01); *G02B 7/021* (2013.01); *G02B 7/02* (2013.01); *G02B 7/10* (2013.01)
USPC ............ 359/826; 359/811; 359/822; 359/823

(58) Field of Classification Search
USPC .......................... 359/811, 817, 822, 823, 826
See application file for complete search history.

(56) References Cited

U.S. PATENT DOCUMENTS

| 4,226,520 | A | * | 10/1980 | Uesugi | ............................ 396/79 |
| 5,751,500 | A | * | 5/1998 | Bedzyk | ......................... 359/740 |
| 6,115,197 | A | * | 9/2000 | Funahashi | ..................... 359/826 |

* cited by examiner

*Primary Examiner* — Mahidere Sahle

(74) *Attorney, Agent, or Firm* — Cowan, Liebowitz & Latman, P.C.

(57) ABSTRACT

A lens apparatus includes a first lens barrel member and a second lens barrel member coupled with the first lens barrel member via a cam mechanism. The first lens barrel member includes a stopper portion and a gear portion. The stopper portion comes into contact with a first contact surface formed in the second lens barrel member, when the first lens barrel member protruding from the second lens barrel member in the optical axis direction receives the external force from a front end side of the first lens barrel member in its protruding direction, to restrict a displacement of the first lens barrel member with respect to the second lens barrel member due to the external force. The gear portion comes into contact with a second contact surface formed in the second lens barrel member to restrict the displacement due to the external force.

9 Claims, 14 Drawing Sheets

LENS APPARATUS AND IMAGE-PICKUP APPARATUS

CROSS-REFERENCE TO RELATED APPLICATION

This application is a divisional of application Ser. No. 12/013,195, filed Jan. 11, 2008, the entire disclosure of which is hereby incorporated by reference.

BACKGROUND OF THE INVENTION

The present invention relates to a lens apparatus extending and retracting with relative movement of a plurality of lens barrel members in an optical axis direction, and an image-pickup apparatus including the same.

Conventionally, cameras provided with a lens barrel that includes a plurality of optical lenses moving in the optical axis direction to change an image-pickup magnification and to perform focusing have been known.

Such a lens barrel is constituted by a cam ring on which a cam groove is formed and a lens barrel member provided with a cam follower portion engaging with the cam groove (for example, refer to Japanese Patent Application Laid-Open No.7-27962).

When such a camera is dropped by a user to be crashed onto the ground, a protruding (extending) lens barrel thereof may be damaged. Then, it is necessary that the lens barrel should have a configuration with high impact resistance and high load bearing.

In general, in order to make the lens barrel more solidly configured against an external force, it is necessary to make the lens barrel larger. Accordingly the size of the camera also increases.

In addition, as for the lens barrel disclosed in Japanese Patent Application Laid-Open No.2001-324663, a flange portion is formed on the cam ring and a receiving portion is formed on a fixed barrel that is contactable with the flange portion.

The lens barrel having such a form described above receives the external force at the receiving portion when the external force is applied thereto, whereby the cam ring does not easily disengage from the fixed barrel.

However, in this form of the lens barrel, positions of the flange portion and a follower pin engaging with the cam groove are different in the optical axis direction, so that the engagement length between the cam ring and the fixed barrel increases. As a result, the thickness (length) of the lens barrel in the optical axis direction increases, thereby increasing the size of the camera.

Thus, Japanese Patent Application Laid-Open No.2006-106463 proposes a lens barrel whose thickness in the optical axis direction is reduced. In this lens barrel, in addition to the configuration of the lens barrel disclosed in Japanese Patent Application Laid-Open No.2001-324663, a cam pin and a stopper rib are disposed at the identical position in the optical axis direction, thereby reducing a retracted length of the lens barrel including the cam ring to decrease the thickness of the camera.

However, the lens barrel disclosed in Japanese Patent Application Laid-Open No.2006-106463 does not have an enough engagement area of the stopper ribs engaging with each other for a normal image-taking position. Consequently, disengagement of the cam ring from the fixed barrel cannot be sufficiently prevented when the external force is applied to the lens barrel.

BRIEF SUMMARY OF THE INVENTION

The present invention provides a lens apparatus having a high resistance (strength) against the external force while the length thereof is reduced in the optical axis direction, and an image-taking apparatus including the same.

According to an aspect, the present invention provides a lens apparatus including a first lens barrel member and a second lens barrel member coupled with the first lens barrel member via a cam mechanism and movably holding the first lens barrel member in an optical axis direction. The first lens barrel member includes a stopper portion and a gear portion receiving a driving force from an actuator that rotatably drives the first lens barrel member. The stopper portion comes into contact with a first contact surface formed in the second lens barrel member, when the first lens barrel member protruding from the second lens barrel member in the optical axis direction receives an external force from a front end side of the first lens barrel member in its protruding direction, to restrict a displacement of the first lens barrel member with respect to the second lens barrel member due to the external force. In a circumferential direction of the first lens barrel member, the gear portion is provided in a region different from a region where the stopper portion is provided, and the gear portion comes into contact in the optical axis direction with a second contact surface formed in the second lens barrel member to restrict the displacement of the first lens barrel member with respect to the second lens barrel member due to the external force.

According to another aspect, the present invention provides an image-pickup apparatus including the above lens apparatus.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

[Embodiment 1]

Figure 1A:
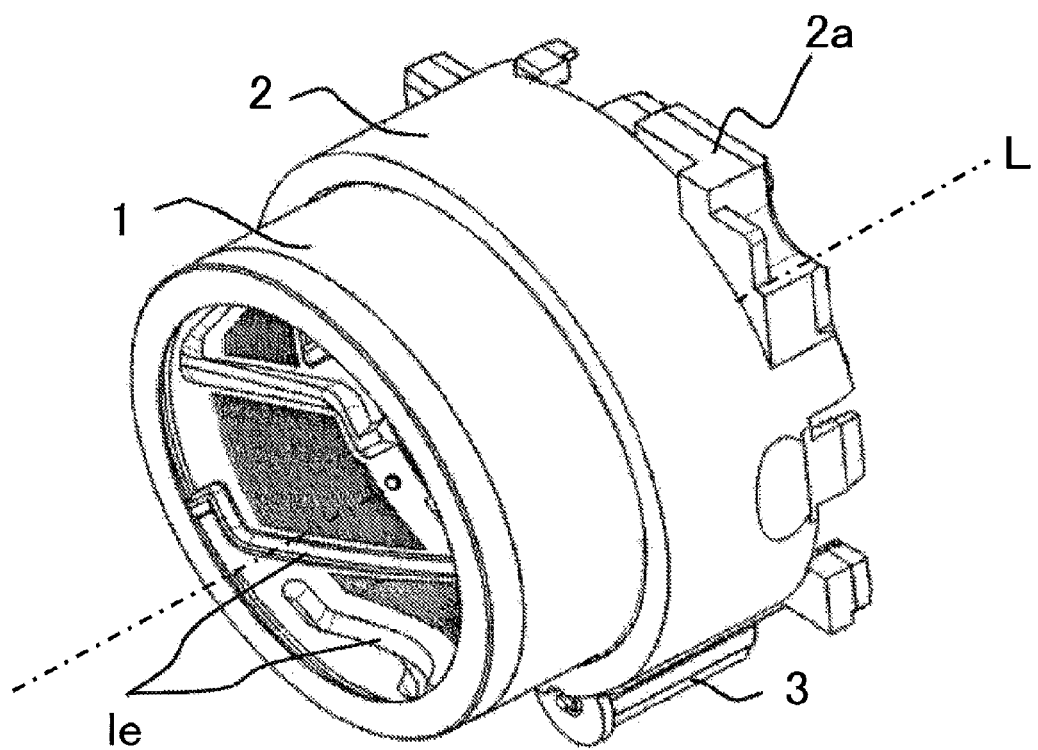
FIG. 1A is a perspective view of an external appearance of a lens barrel that is Embodiment 1 of the present invention.
Figure 1B:
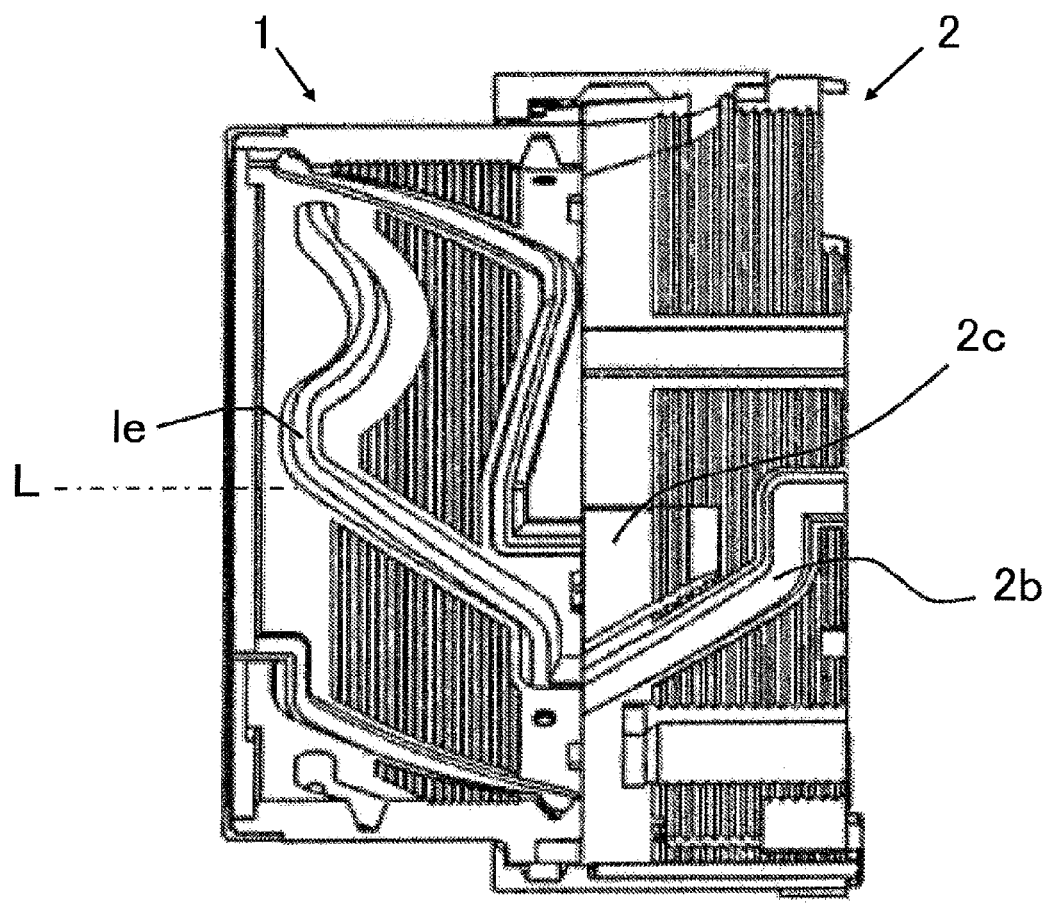
FIG. 1B is a cross sectional view of the lens barrel shown in FIG. 1A.

FIGS. 1A and 1B show a lens barrel (lens apparatus) that is Embodiment 1 used for an image-pickup apparatus of the present invention. As shown in the figures, a lens barrel includes a cam ring 1 that is a first lens barrel member and a fixed barrel 2 that is a second lens barrel member.

The fixed barrel 2 couples with the cam ring 1 via a cam mechanism to hold the cam ring 1 such that the cam ring 1 rotates about an optical axis L to move in a direction of the optical axis L.

A cam groove portion 1e for moving a lens unit (not shown) in the direction of the optical axis L to perform zooming is formed on the inner circumferential surface of the cam ring 1.

Figure 2:
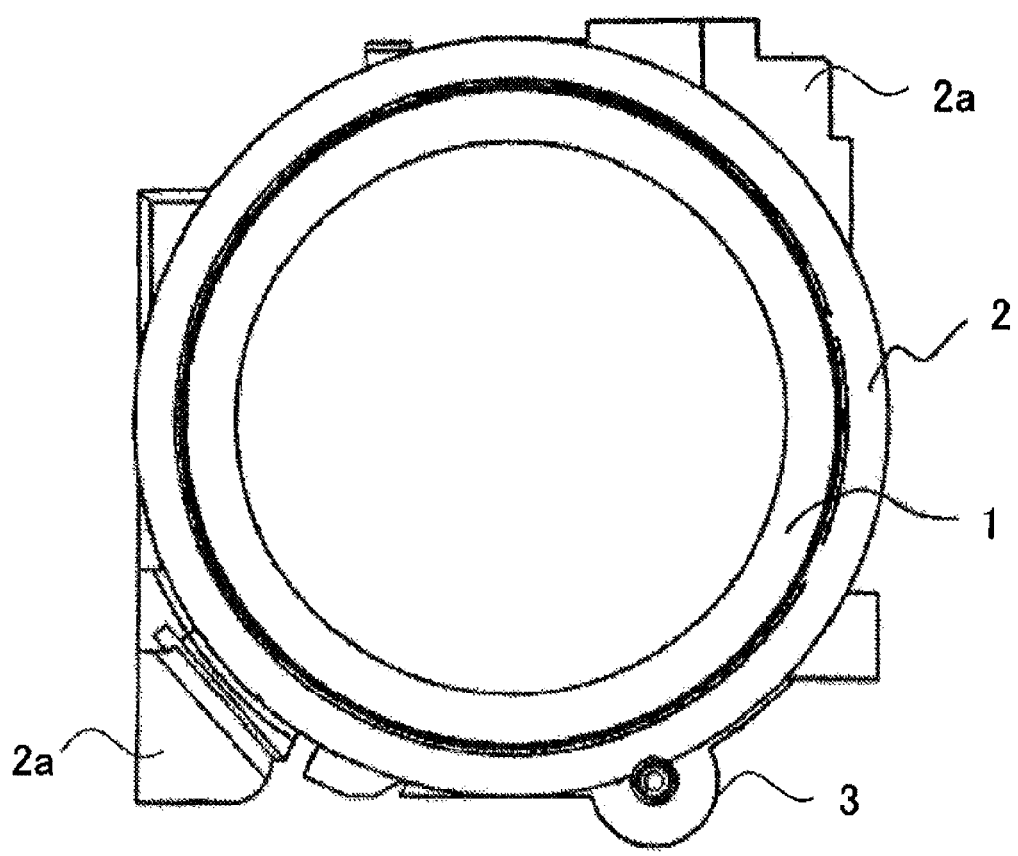
FIG. 2 is a front view of the lens barrel shown in FIG. 1A.

A mounting portion 2a is formed at a rear end side (image side) portion of the fixed barrel 2, the mounting portion 2a being attached to a main body of the image-pickup apparatus (hereinafter referred to as the camera). When the lens barrel is viewed from the front of the camera, the mounting portion 2a protrudes from the outer circumferential surface of the fixed barrel 2 as shown in FIG. 2.

Figure 3:
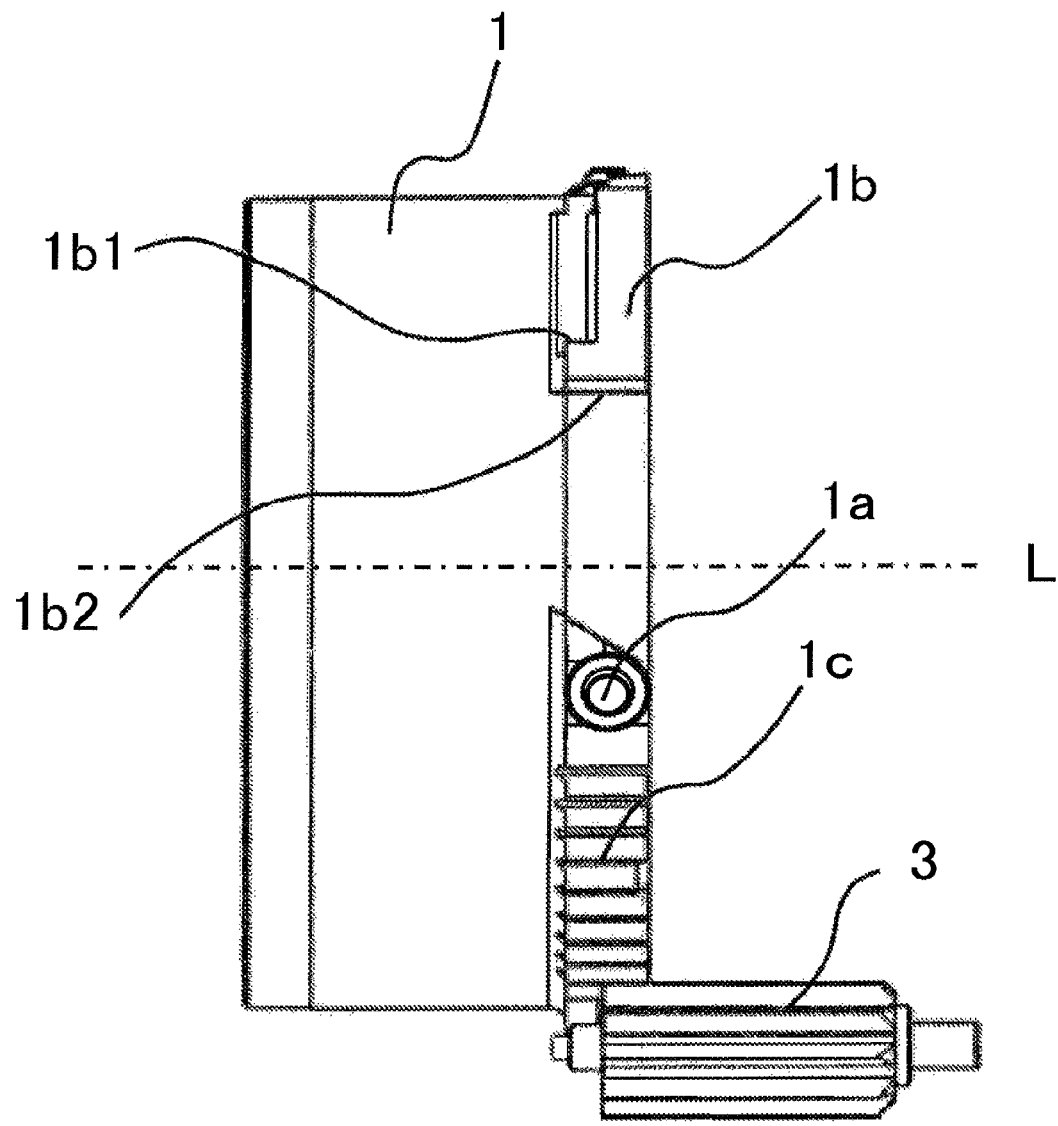
FIG. 3 is a side view of a cam ring included in the lens barrel shown in FIG. 1A.

FIG. 3 shows an external appearance of the cam ring 1. As shown in FIG. 3, a cam follower portion 1a engaging with a cam groove portion 2b, described later, formed on the fixed barrel 2 is formed at a rear end side portion of the outer circumferential surface of the cam ring 1. In addition, a stopper portion 1b is formed at the rear end side portion of the outer circumferential surface of the cam ring 1.

In a state in which the cam ring 1 protrudes from the fixed barrel 2 (in a state of FIGS. 1A and 1B), when the cam ring 1 receives an external force from its front end side in its protruding direction, the stopper portion 1b comes into contact with a first contact surface 2c1 (refer to FIG. 5) formed on the fixed barrel 2 to restrict (in other words, to suppress or stop) a displacement of the cam ring 1 with respect to the fixed barrel 2 due to the external force.

The stopper potion 1b is formed having a rib shape that extends in the circumferential direction of the cam ring 1. A gear portion 1c that receives a driving force from an actuator rotatably driving the cam ring 1 is also formed at the rear end side portion of the cam ring 1.

The gear portion 1c meshes with a cylindrical gear 3 rotatably driven by a motor (not shown in FIG. 3) as the actuator. The cylindrical gear 3 is long enough in the optical axis direction to mesh with the gear portion 1c at any time even when the cam ring 1 moves in the optical axis direction.

In the present embodiment, the cam follower portion 1a, the stopper portion 1b and the gear portion 1c are integrally formed with the cam ring 1 at the rear end side portion of the barrel body 1d (refer to FIG. 4) of the cam ring 1. On the cam ring 1, the cam follower portion 1a, the stopper portion 1b and the gear portion 1c are formed (provided) in different regions from each other in the circumferential direction of the cam ring 1.

Furthermore, at least part of the cam follower portion 1a, at least part of the stopper portion 1b and at least part of the gear portion 1c are formed at the identical position in the optical axis direction.

Particularly in this embodiment, the whole of the cam follower portion 1a, the whole of the stopper portion 1b and the whole of the gear portion 1c are formed in the identical region in the optical axis direction.

Arranging the cam follower portion 1a, the stopper portion 1b and the gear portion 1c as described above allows an engagement length (overlapping amount) of the cam ring 1 and the fixed barrel 2 to be reduced in a state where the cam ring 1 protrudes most to the front end side with respect to the fixed barrel 2, Accordingly, even though the length of the cam ring 1 is short in the optical axis direction, the maximum protruding length of the cam ring 1 from the fixed barrel 2 can be increased. This also makes it possible to increase the zooming magnification of the lens barrel.

Further, this also makes it possible to reduce the length of the cam ring 1 in the optical axis direction, so that the length of the lens barrel in the optical axis direction can be reduced in a state where the cam ring 1 is retracted into the fixed barrel 2. Accordingly, the thickness of the camera in the optical axis direction can be decreased in the state where the cam ring 1 is retracted.

Moreover, the gear portion 1c requires a certain amount of width in the optical axis direction compared to those of the cam follower portion 1a and the stopper portion 1b in consideration of the mechanical strength for transmitting the driving force. Therefore, the whole length of the cam ring 1 is not changed even though the cam follower portion 1a and the stopper portion 1b are formed having the same width as that of the gear portion 1c. The mechanical strength of the cam follower portion 1a and the stopper portion 1b thus can be sufficiently ensured.

As shown in FIGS. 3 and 4 to FIGS. 6 to 9, two rotation stopper surfaces 1b1 and 1b2 are formed at the stopper portion 1b. The two rotation stopper surfaces 1b1 and 1b2 come into contact with contact surfaces 2d1 and 40a of the rotation stopper portions 2d and 40 formed on the fixed barrel 2 in the states where the cam ring 1 is rotated to a retracted end position and to a maximum protruded position, respectively.

The rotation stopper portions 2d and 40 in contact with the rotation stopper surfaces 1b1 and 1b2 respectively restrict the cam ring 1 from being rotated in a retracting direction further than the retracting end position and in a protruding direction further than the maximum protruded position. As described above, since the stopper portion 1b serves also as a rotation-restricting portion of the cam ring 1, it is not necessary to form the rotation-restricting portion such as a protruding portion other than the stopper portion 1b, thereby making the constitution of the cam ring 1 simpler.

Figure 4:
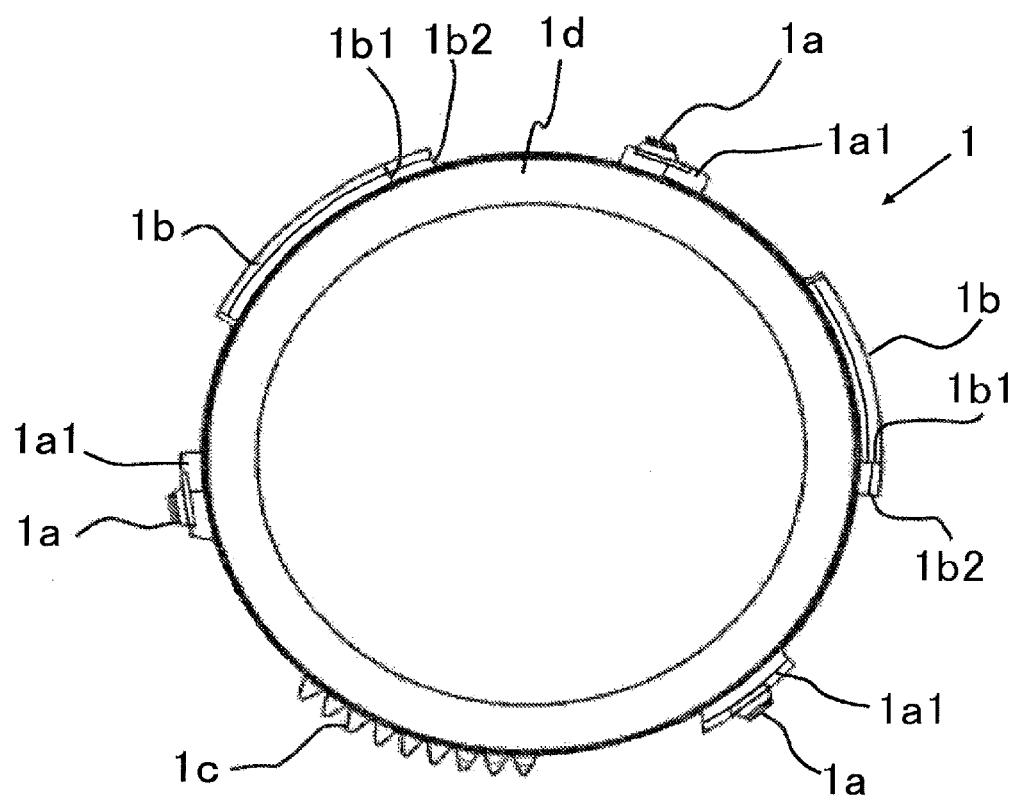
FIG. 4 is a front view of the cam ring shown in FIG. 3.

FIG. 4 shows the configuration of the cam ring 1 when viewed from the front. As shown in the figure, the cam follower portions 1a are integrally formed with the cam ring 1 on the outer circumferential surface of the barrel body 1d of the cam ring 1 at three positions at 120 degrees interval about a center of the cam ring 1. The cam follower portion 1a is formed so that a cam follower having a circular cone shape is formed on a base portion 1a1.

Further, the stopper portions 1b having a rib shape are respectively formed in two spaces among three cam follower portions 1a on the outer circumferential surface of the cam ring 1. Furthermore, the gear portion 1c having a rib shape is formed in the other one space.

Figure 5:
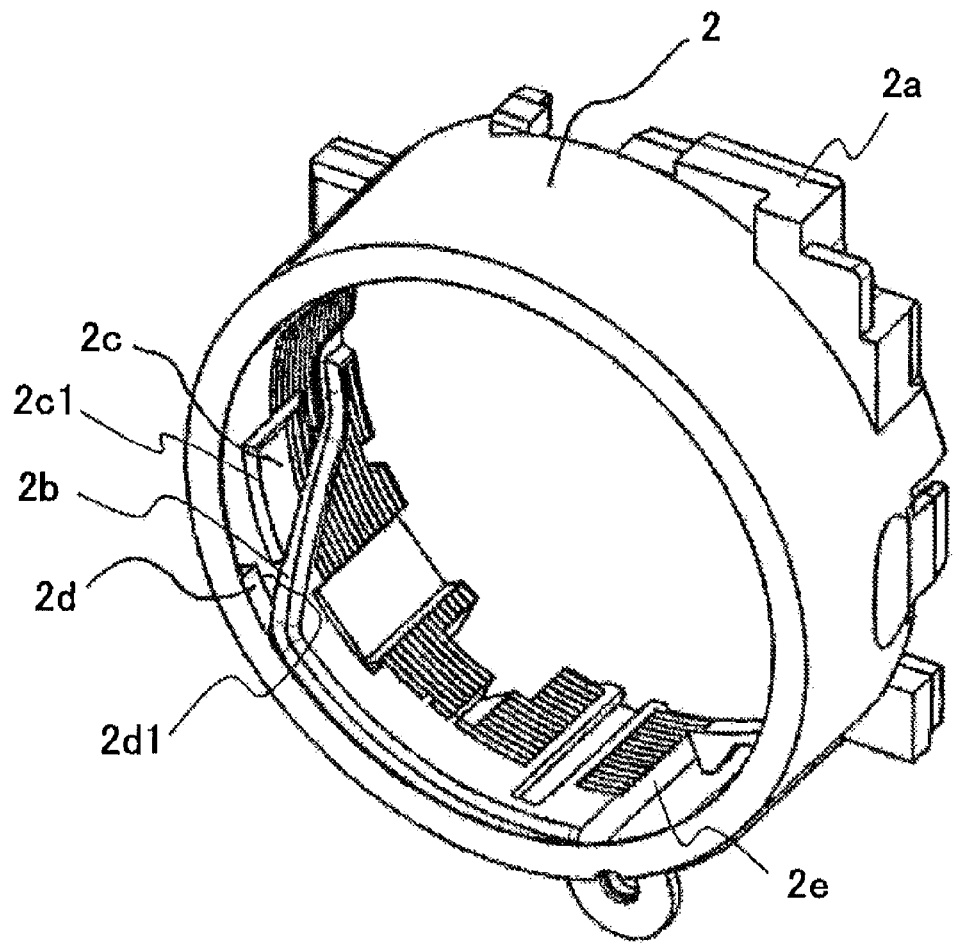
FIG. 5 is a perspective view of an external appearance of a fixed barrel included in the lens barrel shown in FIG. 1A.

FIG. 5 shows an external appearance of the fixed barrel 2. On an inner circumferential surface of the fixed barrel 2, the cam groove portion 2b is formed which engages with the cam follower portion 1a of the cam ring 1 to convert the rotation of the cam ring 1 into a movement thereof in the optical axis direction.

A receiving portion 2c is formed on the inner circumferential surface of the fixed barrel 2, the receiving portion 2c including the first contact surface 2c1 that comes into contact with the rear end surface of the stopper portion 1b of the cam ring 1 when the cam ring 1 protruding from the fixed barrel 2 receives the external force from the front. In a front end side portion (object side portion) of the inner circumferential surface of the fixed barrel 2, the rotation stopper portion 2d is formed which comes into contact with the rotation stopper surface 1b1 of the stopper portion 1b.

Furthermore, an opening 2e is formed in the fixed barrel 2 so that the cylindrical gear 3 meshes with the gear portion 1c of the cam ring 1 therethrough.

FIGS. 6 to 9 are exploded views respectively showing the outer circumferential surface of the cam ring 1 and the inner circumferential surface of the fixed barrel 2. In the figures, the solid line represents the fixed barrel 2, and the dotted line represents the cam ring 1.

Figure 6:
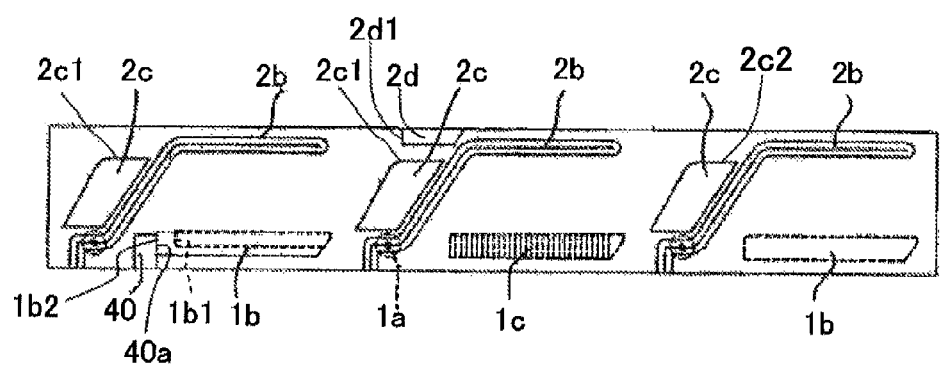
FIG. 6 is an exploded view of the lens barrel in a retracted state.

FIG. 6 shows a state where the cam ring 1 is retracted in the fixed barrel 2, that is, in a retracted state. The power of the camera is turned off in this state.

The cam follower portion 1a, the stopper portion 1b and the gear portion 1c formed on the cam ring 1 are located at a lower end side (image side) in the figure. The rear end surfaces of the stopper portion 1b and the gear portion 1c are located at the identical position in the optical axis direction.

Therefore, the length of the cam ring 1 can be reduced in the optical axis direction and the engagement length of the cam ring 1 and the fixed barrel 2 can be also reduced at the maximum protruded position of the cam ring 1. Moreover, the cam ring 1 can be readily designed and manufactured since the first contact surface 2c1 may be formed so as to extend in a direction orthogonal to the optical axis direction.

The fixed barrel 2 is formed with a rotation stopper portion 40 that restricts the rotation range of the cam ring 1 in the retracting direction. The rotation stopper portion 40 may be formed separately from the fixed barrel 2 to be attached thereto, or may be integrally formed with the fixed barrel 2.

Figure 7:
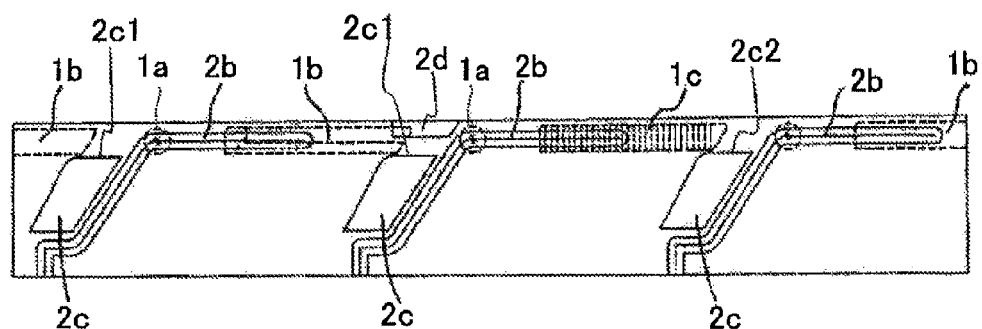
FIG. 7 is an exploded view of the lens barrel in a state immediately before an image-taking state.

Rotating the cam ring 1 from the state of FIG. 6 about the optical axis direction causes the cam ring 1 to protrude with respect to the fixed barrel 2 by an engaging effect of the cam groove portion 2b and the cam follower portion 1a, which is shown in FIG. 7. In this state, the cam ring 1 and the fixed barrel 2 are located immediately before they reach an image-pickup position (wide-angle end state).

At this point, the cam follower portion 1a (base portion 1a1), the stopper portion 1b and the gear portion 1c are located in front of the receiving portion 2c of the fixed barrel 2. The receiving portion 2c is located such that the movement of the cam ring 1 is not interfered by the cam follower portion 1a, the stopper portion 1b and the gear portion 1c.

A small space is formed between the rear end surfaces of the stopper portion 1b and the gear portion 1c and the front end surface (first contact surface 2c1 and second contact surface 2c2) of the receiving portion 2c, when the external force 1 is not applied to the cam ring 1 from the front end side in the protruding direction.

Since the rear end surfaces of the stopper portion 1b and the gear portion 1c and the front end surface (2c1, 2c2) of the receiving portion 2c come into contact with each other when the external force is applied to the cam ring 1 from the front end side in the protruding direction, a displacement of the cam ring 1 to the rear end side with respect to the fixed barrel 2 due to the external force is restricted.

In the state shown in FIG. 7, even though a contact area of the stopper portion 1b and the receiving portion 2c (first contact face 2c1) is small, the gear portion 1c comes into contact with the other receiving portion 2c (second contact surface 2c2). Therefore, the displacement of the cam ring 1 to the rear end side is strongly restricted when the external force is applied to the cam ring 1. At this point, the engagement state between the cam follower portion 1a and the cam groove portion 2b is maintained.

Figure 8:
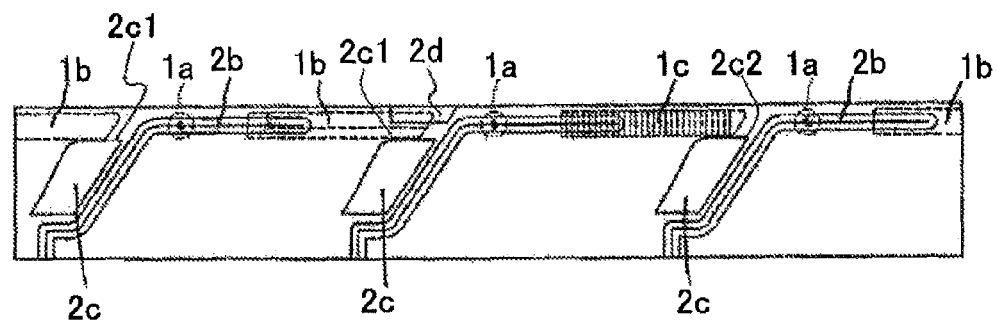
FIG. 8 is an explanatory view showing the lens barrel in a wide-angle end state.

FIG. 8 shows a state where the cam 1 is slightly rotated from the state of FIG. 7. This is an image-taking state (wide-angle end state) of the camera. In this state, the contact area of the rear end surfaces of the stopper portion 1b and the gear portion 1c and the front end surface of the receiving portion 2c (first contact portion 2c1 and second contact portion 2c2) is sufficiently obtained.

In this state, when the external force is applied to the cam ring 1 from the front end side in the protruding direction due to drop of the camera or the like, the external force is received by the receiving portion 2c. Therefore, the cam follower portion 1a is prevented from disengaging from the cam groove portion 2b.

Figure 9:
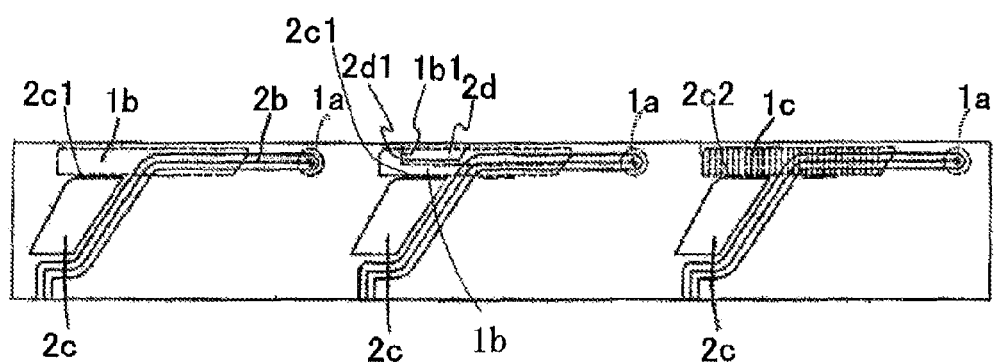
FIG. 9 is an explanatory view of the lens barrel in a telephoto end state.

FIG. 9 shows another image-taking state (telephoto end state) where the cam ring 1 is further rotated from the state of FIG. 8. During the rotation of the cam ring 1, a lens barrel member and a lens unit disposed inside of the cam ring 1 are driven to the object side or the image side, thereby enabling zooming.

In this state, the end surface 2d1 of the rotation stopper portion 2d comes into contact with the rotation stopper surface 1b1 of the stopper portion 1b, thereby restricting the cam ring 1 from further being rotated.

Figure 10:
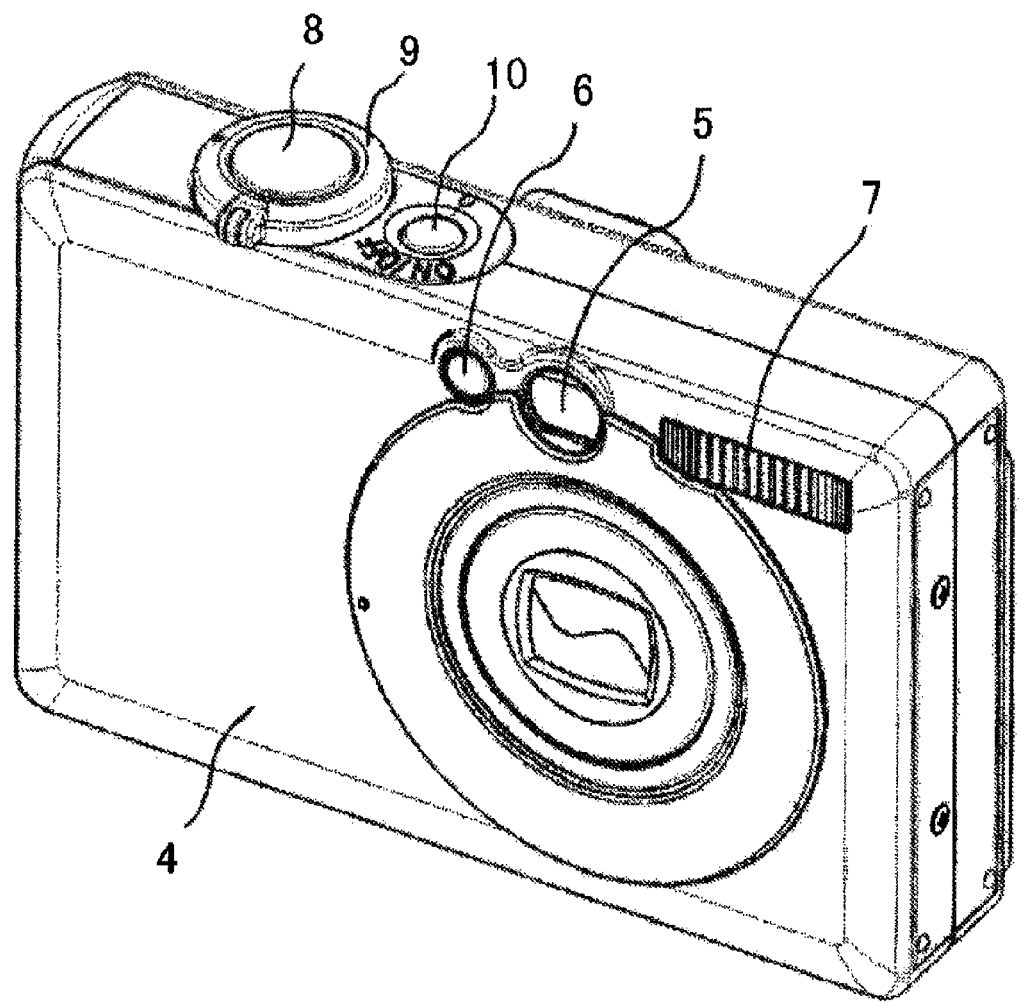
FIG. 10 is a perspective view of an external appearance of a digital camera including the lens barrel shown in FIG. 1A in the retracted state.
Figure 11:
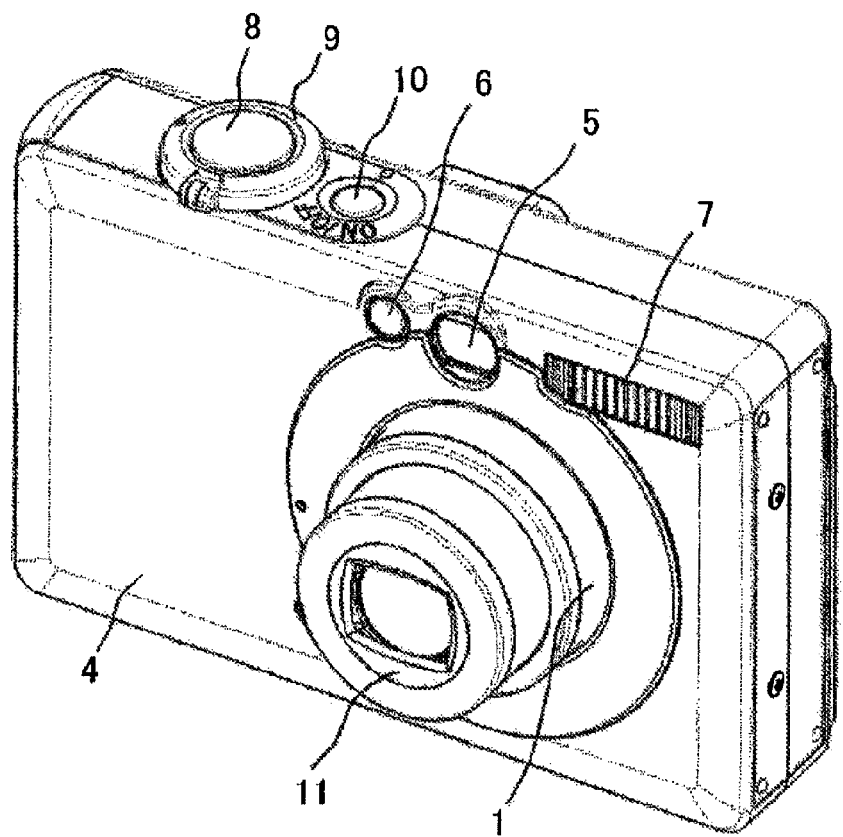
FIG. 11 is a perspective view of an external appearance of the digital camera including the lens barrel shown in FIG. 1A in the wide-angle end state.
Figure 12:
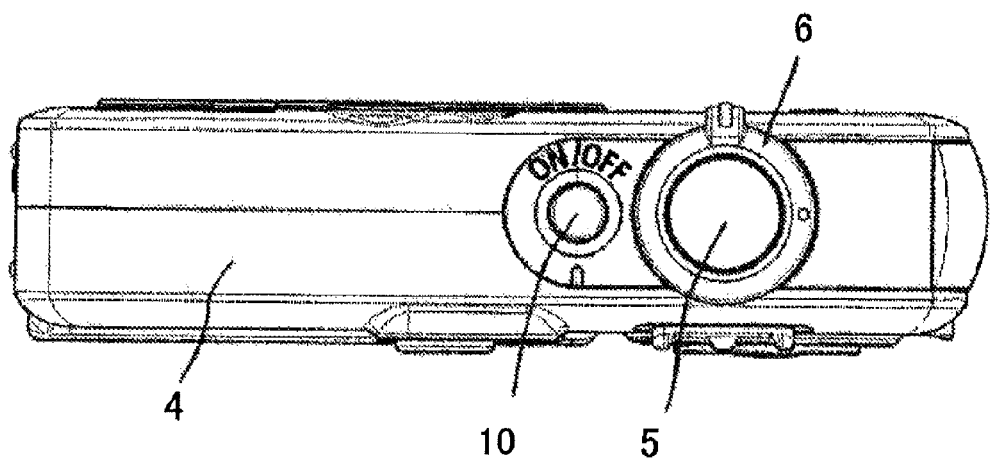
FIG. 12 is a top view of the digital camera shown in FIG. 10.

FIGS. 10 to 12 show a digital still camera 4 as the image-taking apparatus that is another embodiment of the present invention including the lens barrel 11 shown in FIGS. 1 to 9.

FIG. 10 shows the camera 4 in the state where the power thereof is turned off and the lens barrel 11 is retracted. The camera 4 is provided with a finder 5 for determining a subject composition for image pickup, and a light-emitting window 6 for emitting AF assist light.

Furthermore, the camera 4 is provided with a flash unit 7 for illuminating the subject with flash light. A release button 8, a zoom switch 9 and a power on/off button 10 are provided on a top surface of the camera 4. FIG. 12 is a top view of the digital camera 4 in the state of FIG. 10.

FIG. 11 shows the camera 4 after the power is turned on and in the wide-angle end state. In this state, the lens barrel 11 protrudes from the front surface of the camera body. The cam ring 1 constituting part of the lens barrel 11 also protrudes with respect to the fixed barrel 2 arranged in the camera body.

An operation of the zoom switch 9 in this state causes the lens barrel 11 to extend and retract in the optical axis direction as the cam ring 1 rotates about the optical axis, thereby performing zooming.

Figure 13:
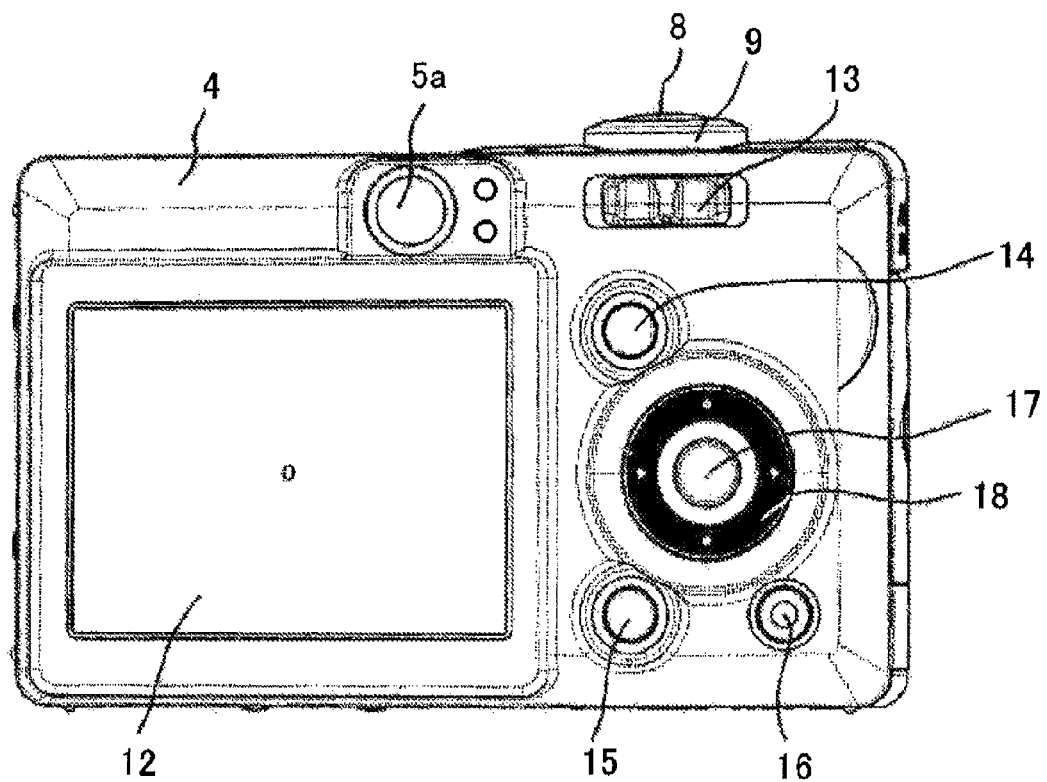
FIG. 13 is a rear view of the digital camera shown in FIG. 10.

FIG. 13 shows a rear surface of the camera 4, where a liquid crystal display (LCD) 12 is provided. This liquid crystal display 12 displays data stored in a memory and image data read from a memory card.

A plurality of operation buttons 13 to 18 is provided around the liquid crystal display 12.

Using these operation buttons 13 to 18 enables selection of an image pickup mode, a play mode, a moving image pickup mode or the like in the digital camera 4. A finder eyepiece 5a is provided above the liquid crystal display 12.

Figure 14:
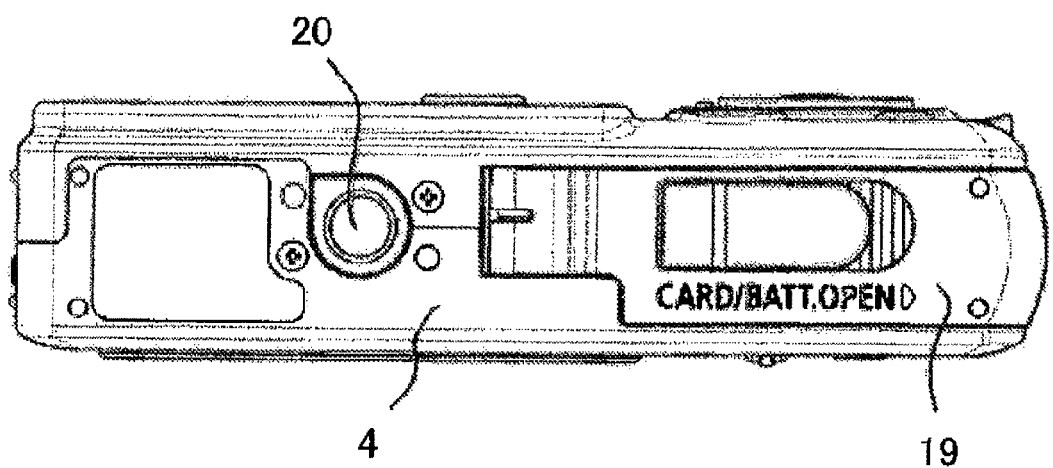
FIG. 14 is a bottom view of the digital camera shown in FIG. 10.

FIG. 14 shows a bottom surface of the digital camera 4, where a battery cover 19 and a tripod-mounting portion 20 are provided.

Figure 15:
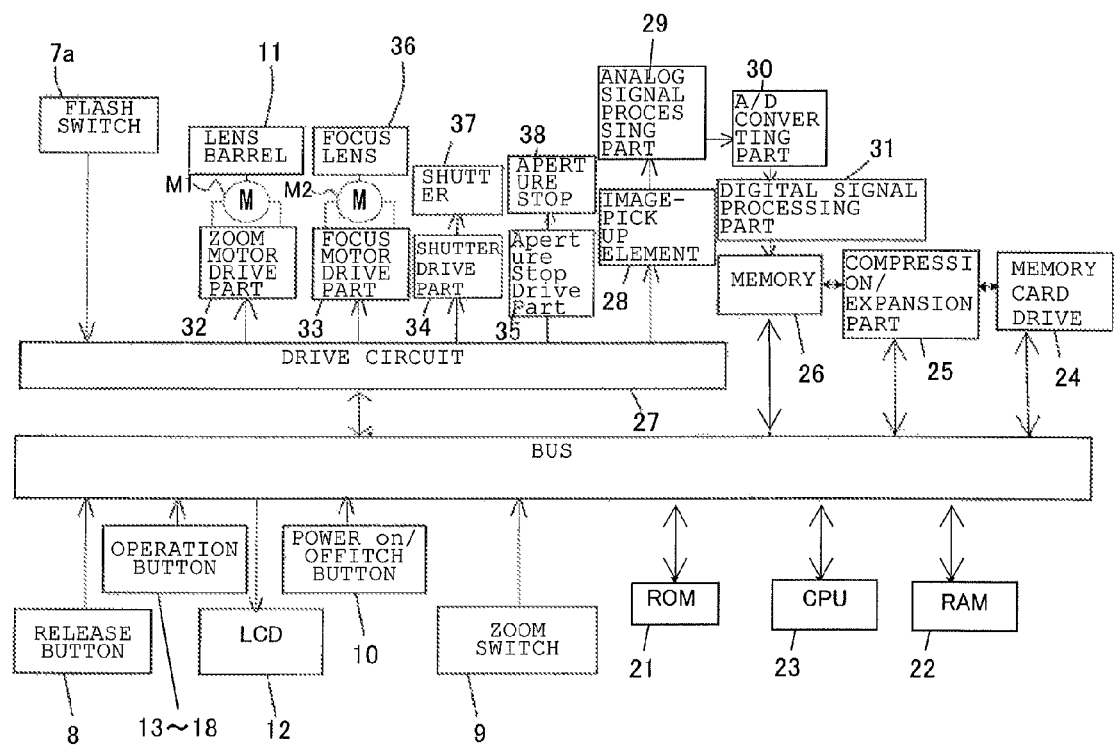
FIG. 15 is a block diagram showing an internal configuration of the digital camera shown in FIG. 10.

FIG. 15 is a block diagram showing the internal configuration of the digital camera 4. As shown in the figure, the release button 8, the power on/off button 10, the liquid crystal display (LCD) 12 and the operation buttons 13 to 18 are connected to a bus.

In addition, the bus is connected to a ROM 21 in which programs for controlling various components are stored, a RAM 22 in which data that is used for the controlling program is temporarily stored, and a CPU 23 performing various kinds of processing. Moreover, the bus is also connected to a memory card drive 24, a compression/expansion part 25, a memory 26 and a drive circuit 27.

A full-press operation of the release button 8 causes the CPU 23 to control the drive of an image-pickup element (for example, a CCD sensor or a CMO sensor) 28 via the bus and the drive circuit 27. An output signal from the image-pickup element 28 is input to an A/D converting part 30 via an analog signal processing part 29.

The A/D converting part 30 converts the analog signal from the image-pickup element 28 into a digital signal. An output signal from the A/D converting part 30 is stored in the memory 26 via a digital signal processing part 31.

The output signal from the memory 26 is input to the compression/expansion part 25, where compression processing according to a JPEG system, a TIFF system or the like is performed on the data. The output signal after the compression processing is stored in the memory card inserted in the memory card drive 24. When the data is obtained from the memory card drive 24, the compression/expansion part 25 performs expansion processing on the compressed image data.

The drive circuit 27 is connected to a zoom motor drive part 32, a focus motor drive part 33, a shutter drive part 34 and an aperture stop drive part 35. The zoom motor drive part 32 drives a lens barrel motor M1 to extend and retract the lens barrel 11 (that is, to rotate and move the cam ring 1).

The focus motor drive part 33 drives a focus motor M2 to drive a focus lens 36. The shutter drive part 34 drives a shutter 37, and the aperture stop drive part 35 drives an aperture stop 38.

In such a configuration, when the user presses the power on/off button 10 to turn the power on, the CPU 23 reads necessary control programs from the ROM 21 to start an initial operation. Specifically, the cam ring 1 is rotated to a position corresponding to the image-pickup position, thereby setting the camera to a standby state.

When the release button 8 for image pickup is pressed, the CPU 23 detects luminance of the subject (that is, performs photometry) through the image-pickup element 28 and calculates adequate aperture value and adequate shutter speed based on the detected luminance to determine whether or not to use the flash unit 7. It is also possible for the user to select whether or not to forcibly use the flash unit 7 through the operation button 14.

Furthermore, a half-press operation of the release button 8 causes the CPU 23 to control the focus motor drive part 33 to perform auto focus (to move the focus lens 36) using an output from the image-pickup element 28.

The full-press operation of the release button 8 causes the shutter drive part 34 to open and close the shutter 37 to pick up a subject image by the image-pickup element 28. Electric charges are stored in the image-pickup element 28 depending on the amount of entering light and then an image signal is generated based on the electric charges, The image data stored in the memory 26 can be displayed on the liquid crystal display 12 via the bus. The image data stored in the memory card inserted in the memory card drive 24 can also be displayed on the liquid crystal display 12 via the compression/expansion part 25 and the bus.

In a case where the user determines that the image displayed on the liquid crystal display 12 is not necessary, the user can delete the image data through an operation of the operation button 16. Furthermore, a press operation of the zoom switch 9 causes the CPU 23 to drive the lens barrel motor M1 via the bus, the drive circuit 27 and the zoom motor drive part 32 to drive the lens barrel 11 (cam ring 1).

Figure 16:
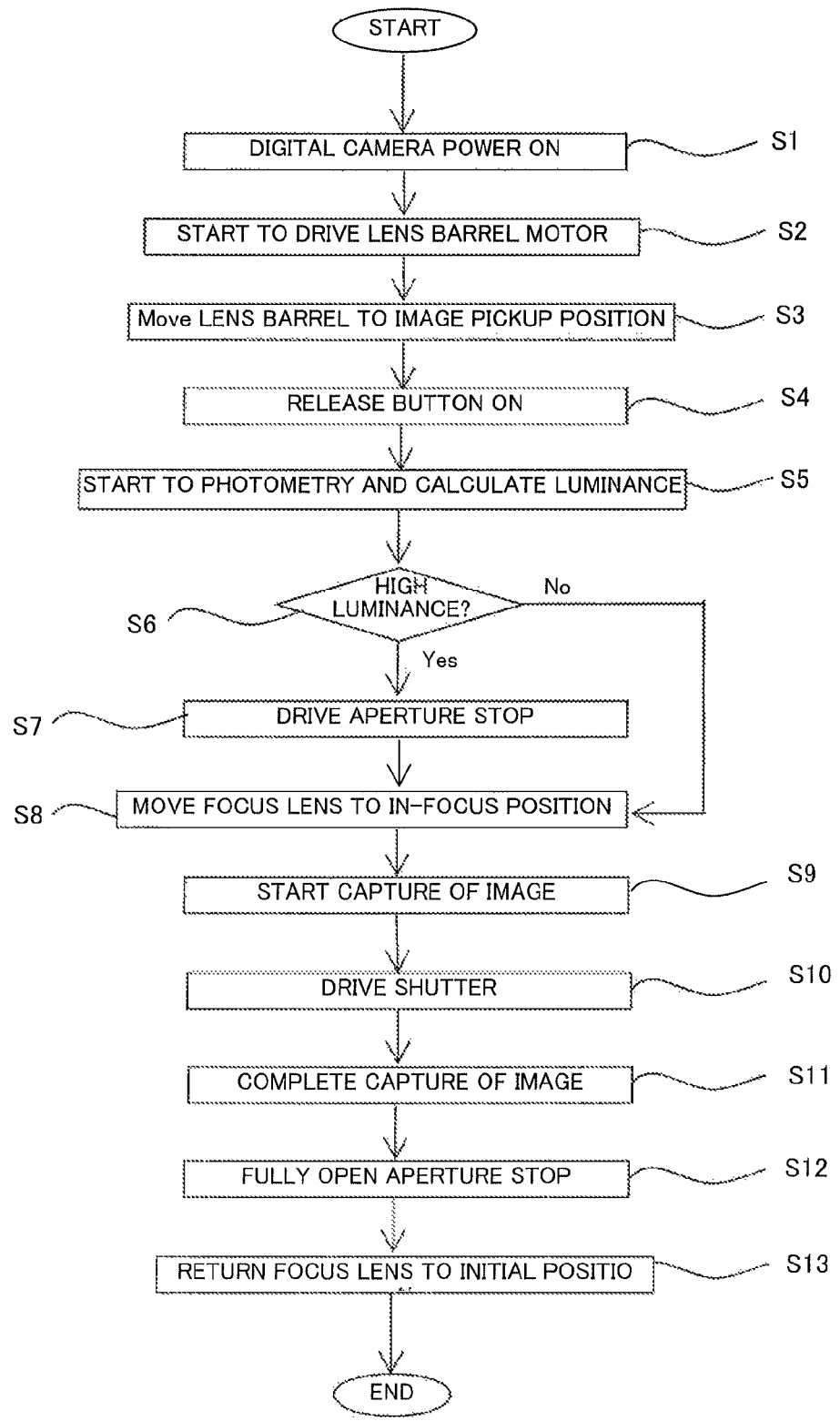
FIG. 16 is a flow chart showing processing from starting to completing an image-pickup operation in the digital camera in FIG. 10.

FIG. 16 shows a flow of processing performed by the CPU 23 from the start of image pickup to the completion thereof. Firstly, when the power of the camera 4 is turned on by the user at step S1, the CPU drives the lens barrel motor M1 via the drive circuit 27 and the zoom motor drive part 32 at step S2.

With this operation, the lens barrel 11 (cam ring 1) is moved from the retracted position shown in FIG. 10 to the image-pickup position shown in FIG. 11 at step S3.

Next, a half-press operation of the release button 8 by the user at step S4 causes the CPU 23 to perform photometry and then to calculate the luminance of the subject at step S5.

At step S6, the CPU 23 determines whether or not the calculated luminance is higher than a predetermined value. If the calculated luminance is higher than the predetermined value, the process proceeds to step S7 where the CPU 23 reduces the aperture area of the aperture stop 38 via the aperture stop drive part 35 to decrease the amount of the entering light.

On the other hand, if the calculated luminance is lower than the predetermined value, the CPU 23 does not drive the aperture stop 38 to fully open the aperture stop 38.

Next, at step S8, the CPU 23 drives the focus motor M2 via the focus motor drive part 33 to move the focus lens 36. When the focus lens 36 is moved to an in-focus position to the subject, the CPU 23 starts to capture the image of the subject through the image-pickup element 28 at step S9.

Lastly, the CPU 23 drives the shutter 37 from an opened state to a closed state via the shutter drive part 34 at step S10 and then completes capture of the image at step S11. After that, the CPU 23 causes the aperture stop 38 to fully open at step S12, and then causes the focus lens 36 to return to the initial position to complete the image pickup operation at step S13.

[Embodiment 2]

Figure 17:
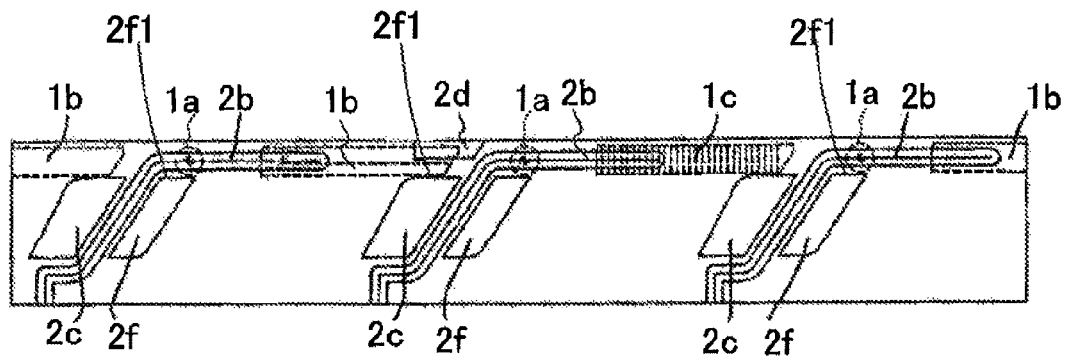
FIG. 17 is an exploded view showing a lens barrel that is Embodiment 2 of the present invention.

FIG. 17 is an exploded view showing a cam ring 1 and a fixed barrel 2 that constitute part of a lens barrel that is Embodiment 2 of the present invention. The lens barrel of Embodiment 2 is also used for the camera 4 described in Embodiment 1 . In Embodiment 2, components identical to those in Embodiment 1 are designated with the same reference numerals, and the description thereof will be omitted.

Embodiment 1 described the case where the rear end surfaces of the stopper portion 1b and the gear portion is come into contact with the front end surface of the receiving portion 2c when the external force is applied to the cam ring 1.

In addition to this, in this embodiment, a base portion 1a1 of the cam follower portion 1a comes into contact with a front end surface (third contact surface 2f1) of a receiving portion 2f formed on the inner circumferential surface of the fixed barrel 2. The receiving portion 2f is formed integrally with the fixed barrel 2 at the opposite side of the receiving portion 2c with respect to the cam groove portion 2b.

According to this embodiment, the stopper portion 1b, the gear portion 1c and the base portion 1a1 respectively come into contact with the receiving portions 2c and 2f when the external force is applied to the cam ring 1 from the front end side in the protruding direction. Accordingly, a displacement of the cam ring 1 with respect to the fixed barrel 2 is restricted in a state where the cam follower portion 1a is prevented from disengaging from the cam groove portion 2b. Consequently, the resistance of the lens barrel against the external force can be further enhanced.

According to each of the embodiments described above, the stopper portion comes into contact with the first contact surface of the second lens barrel member when the first lens barrel member receives the external force. In addition to this, the gear portion also comes into contact with the second contact surface of the second barrel member. Thereby, the displacement of the first lens barrel member with respect to the second lens barrel member (disengagement of the cam mechanism) is prevented.

Thus the sufficient resistance (strength) against the external force can be obtained while the thickness of the stopper portion in the optical axis direction is reduced. Accordingly, the protruding amount of the first lens barrel member in the optical axis direction can be increased while the length thereof is reduced in the same direction.

Reducing the length of the first lens barrel member in the optical axis direction makes it possible also to reduce that of the lens apparatus in the same direction in the retracted state, thereby enabling reduction of the thickness of the image-pickup apparatus including the lens apparatus.

While the present invention has been described with reference to exemplary embodiments, it is to be understood that the invention is not limited to the disclosed exemplary embodiments The scope of the following claims is to be accorded the broadest interpretation so as to encompass all modifications, equivalent structures and functions.

For example, each of the above-described embodiments showed an example in which the first lens barrel member corresponds to the cam ring 1 and the second lens barrel member corresponds to the fixed barrel 2. However, the present invention is not limited thereto. The present invention can be applied for any combinations of adjacent two lens barrel members when the lens barrel includes a plurality of lens barrel members.

Moreover, each of the embodiments described above showed the digital still camera as an example of the image-pickup apparatus. However, the present invention can also be applied for other image-pickup apparatuses such as film cameras and video cameras.

Furthermore, each of the embodiments described above showed an example in which the cam follower portion 1a, the stopper portion 1b and the gear portion 1c are integrally formed with the cam ring 1. However, they may be formed as separated members from the cam ring 1 and attached to the cam ring 1.

Each of the embodiments described above showed an example in which the receiving portions 2c and 2f are integrally formed with the fixed barrel 2. However, they may be formed as separated members and attached to the fixed barrel 2.

Moreover, each of the embodiments described above showed the case where the cam follower portion 1a formed on the cam ring 1 engages with the cam groove portion 2b formed on the fixed barrel 2. However, the present invention is not limited thereto. The cam follower portion may engage with a protruding cam.

Furthermore, the present invention is not limited to these embodiments and various variations and modifications may be made without departing from the scope of the present invention.

This application claims foreign priority benefits based on Japanese Patent Application No. 2007-007565, filed on Jan. 17, 2007, which is hereby incorporated by reference herein in its entirety as if fully set forth herein.

What is claimed is:

1. A lens barrel apparatus comprising:
   a first barrel member including a stopper portion and a gear portion receiving a driving force, the stopper portion and the gear portion being provided at different positions with respect to each other in a circumferential direction; and
   a second barrel member that is coupled with the first barrel member via a cam mechanism to move the first barrel member in an optical axis direction,
   wherein, when the first barrel member protrudes relatively from the second barrel member in the optical axis direction and receives an external force, a displacement of the first barrel member with respect to the second barrel member due to the external force is restricted by contact of at least one of an end surface of the stopper portion and an end surface of the gear portion to a contact surface of the second barrel member.

2. A lens barrel apparatus according to claim 1, wherein the stopper portion and the gear portion respectively come into contact with the first contact surface and the second contact surface in a state where the cam mechanism coupling of the first barrel member and the second barrel member is not disengaged.

3. A lens barrel apparatus according to claim 1, wherein at least part of the stopper portion and at least part of the gear portion are located at a position identical to each other in the optical axis direction.

4. A lens barrel apparatus according to claim 3, wherein an end surface of the stopper portion coming into contact with the first contact surface and an end surface of the gear portion coming into contact with the second contact surface are located at a position identical to each other in the optical axis direction.

5. A lens barrel apparatus according to claim 1,
   wherein the first barrel member includes in the circumferential direction a cam follower portion provided in a region different from the regions where the stopper portion and the gear portion are provided, the cam follower portion engaging with a cam formed in the second barrel member, and
   wherein a base portion of the cam follower portion comes into contact with a third contact surface formed in the second barrel member to restrict the displacement of the first barrel member with respect to the second barrel member due to the external force.

6. A lens barrel apparatus according to claim 5, wherein at least part of the cam follower portion is located at a position identical to the positions of the stopper portion and the gear portion.

7. A lens barrel apparatus according to claim 1, wherein a rotation stopper surface is formed on the stopper portion, the rotation stopper surface coming into contact with a contact surface formed on the second barrel member in a rotation direction of the first barrel member to restrict a rotation range of the first barrel member with respect to the second barrel member.

8. An image-pickup apparatus comprising:
   a lens barrel apparatus according to claim 1, and an image-pickup element that captures an object image formed by the lens apparatus.

9. A lens barrel apparatus according to claim 1, wherein the second barrel member includes a contact surface located on a circumferential surface formed on a side where cam coupling of the cam mechanism with the first barrel member is made.

* * * * *